(12) United States Patent
Boledovic et al.

(10) Patent No.: US 11,950,118 B2
(45) Date of Patent: *Apr. 2, 2024

(54) MODULAR TEST AND MEASUREMENT DEVICE

(71) Applicant: VIAVI SOLUTIONS INC., Chandler, AZ (US)

(72) Inventors: Craig Stephen Boledovic, Walkersville, MD (US); Maxime Gatti, Saint Etienne (FR); Andrew Thomas Rayno, Frederick, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,326

(22) Filed: Feb. 3, 2023

(65) Prior Publication Data

US 2023/0189028 A1 Jun. 15, 2023

Related U.S. Application Data

(63) Continuation of application No. 16/938,668, filed on Jul. 24, 2020, now Pat. No. 11,601,829.

(51) Int. Cl.
*H04W 24/08* (2009.01)
*H04M 1/24* (2006.01)
*H04W 88/06* (2009.01)

(52) U.S. Cl.
CPC ............. *H04W 24/08* (2013.01); *H04M 1/24* (2013.01); *H04W 88/06* (2013.01)

(58) Field of Classification Search
CPC ....... H04M 1/24; H04W 24/06; H04W 24/08; H04W 88/06
See application file for complete search history.

(56) References Cited

U.S. PATENT DOCUMENTS

| | | | | |
|---|---|---|---|---|
| 5,511,108 | A * | 4/1996 | Severt | G01R 15/12 379/22 |
| 6,064,721 | A * | 5/2000 | Mohammadian | H04M 1/24 379/10.01 |
| 9,717,045 | B2 * | 7/2017 | Eremenko | H04W 52/0203 |

(Continued)

*Primary Examiner* — Kashif Siddiqui
(74) *Attorney, Agent, or Firm* — Mannava & Kang, P.C.

(57) ABSTRACT

A modular test instrument for performing tests and measurements in a network is disclosed. The modular test instrument may include a modular processing unit comprising a processor and memory, the modular processing unit connectable to at least one modular test unit or modular test subunit. The modular test instrument may also include a modular display unit connectable to the modular processing unit or the modular test unit. Display modularity may enable quick and cost-efficient display replacement when damage, malfunction, or failure is incurred. Furthermore, the modular test instrument may include an additional modular test subunit connectable to at least one of the modular processing unit or the modular test unit. When the modular processing unit is fitted with the modular display unit, the modular least, or modular test subunit, for example, the modular test instrument may form an integrated test instrument for performing any number of tests and measurements associated with installation, troubleshooting, or maintenance of a long-term evolution (LTE) or 5G network.

20 Claims, 6 Drawing Sheets

(56) References Cited

U.S. PATENT DOCUMENTS

| | | | |
|---|---|---|---|
| 9,723,564 B2* | 8/2017 | Fishman | H04W 52/0261 |
| 9,917,936 B2* | 3/2018 | Gadi | H04B 1/3888 |
| 10,127,052 B2* | 11/2018 | Liu | G06F 13/4081 |
| 11,601,829 B2* | 3/2023 | Boledovic | H04W 24/08 |
| 2016/0056902 A1* | 2/2016 | Eremenko | H04B 17/16 |
| | | | 455/67.11 |
| 2017/0054835 A1* | 2/2017 | Gadi | H04M 1/0266 |
| 2021/0132035 A1* | 5/2021 | Adelman | H04W 12/08 |

* cited by examiner

300

Provide a modular display unit comprising a display element, a display face, and a display connector
301

Provide a modular processing unit comprising a processor and memory, the modular processing unit comprising a processing unit interface, a first processing unit connector face, and a second processing unit connector face
302

Provide a modular test unit comprising a test unit interface, a first test unit connector face, and a second test unit connector face
303

FIG. 3

MODULAR TEST AND MEASUREMENT DEVICE

PRIORITY

This patent application is a Continuation under 35 U.S.C. § 120 of co-pending U.S. patent application Ser. No. 16/938,668, filed Jul. 24, 2020, the disclosure of which is hereby incorporated by reference in its entirety.

TECHNICAL FIELD

This patent application is directed to test and measurement instrumentation for telecommunication networks, and more specifically, to a modular test and measurement device using replaceable and interchangeable units, modules, and/or components.

BACKGROUND

Accurate and reliable testing is required to troubleshoot and ensure peak performance of telecommunication networks. At any particular cell site, there may be various technologies, such as LTE and 5G network topologies and infrastructure, that will converge. In order to integrate all the various elements into a functioning cell site, for example, there may be a high demand for multiple test sets, measurements, test processes, and/or report consolidation, which may be required during various stages of network provisioning, such as installation or maintenance.

BRIEF DESCRIPTION OF DRAWINGS

Features of the present disclosure are illustrated by way of example and not limited in the following Figure(s), in which like numerals indicate like elements, in which:

FIG. 3 illustrates a flow chart of a method for providing a modular test device for performing tests and measurements in a network, according to an example.

DETAILED DESCRIPTION

Figure 1:
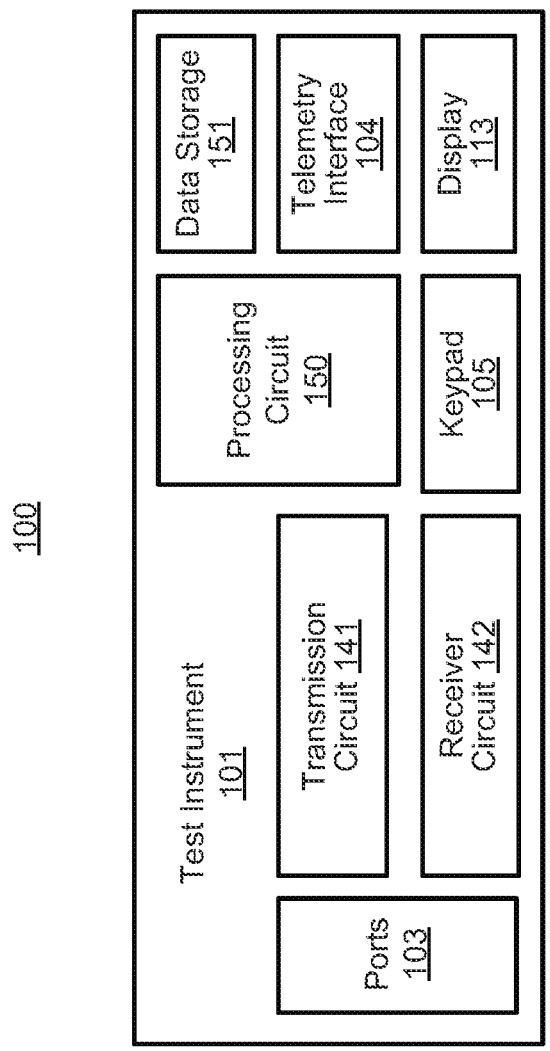
FIG. 1 illustrates a block diagram of a modular test instrument for performing tests and measurements in a network, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, in order to integrate all the various elements into a functioning cell site, for example, there may be a high demand for multiple test sets, measurements, test processes, and/or report consolidation, which may be required during various stages of network provisioning, installation or maintenance. However, conventional systems and methods often fail to meet these demands.

A technical issue, for example, with conventional test and measurement devices is that they fail to include, in a single device, all the functionality needed to perform a variety of tests and/or measurements, and to the extent that certain combination of tools and systems can meet these demands, these devices tend to be bulky, cumbersome, and costly. A technician may therefore be required to rely on a selection of distinct and separate tools or instruments rather than a single device. In addition, if any portion of a single test device fails or malfunctions, replacement of the entire test device is usually the only option to continue performing tests and measurements. In some situations, the entire test device may be rendered inoperative or queued for repair or service even if just one portion of the device fails.

Accordingly, systems and methods for providing a test device that is capable for performing various tests and measurements in a network is described herein. As described herein, the test device may provide any number of tests or measurements, such as fiber inspection and validation, cable and antenna analysis, air tests and measurements using spectrum and interference analysis, using an intuitive workflow automation in a single test device, which may also include various built-in configurations and reporting features. Ultimately, a single test device may replace multiple independent tools or devices, provide coverage any number of radio types (e.g., 4G long-term evolution (LTE), 5G, etc.) and topologies (macro-cell, small-cell, cloud/centralized-radio access network (C-RAN), and/or distributed antenna system (DAS)), and better scale to the growing needs of any network or platform due to is "modular" nature. Furthermore, the modular test device may provide a combination of precise measurements, reliable and consistent results, lower training costs, and increase workload efficiencies beyond what any conventional test device could do.

The test device may also be a modular test device, for example, that is formed of plurality of interconnected modular components, subcomponents, units, or subunits. In this way, if a portion of the test device malfunctions or fails, only that portion of the test device can be replaced. It should be appreciated that it is not uncommon for the test device to be dropped by a technician or for the test device to suffer damage during a normal or routine testing and measurement scenarios. In some examples, the display of the test device, which may be one of the more sensitive components of test device and therefore more susceptible to damage, may crack or malfunction due to routine wear and tear. A conventional test device with a broken or inoperative display may require replacement of the entire test device, which may be extremely costly and inefficient. Using the modular test device, as described herein, only the display module of the modular test device, for example, may be replaced with a new or functioning display module rather than exchanging the entire test device.

In addition or alternatively, the modular test device, with its various modular and interchangeable components, may allow various configurations and customizations beyond display modularity. A technician, for example, using such a test device may be able to combine various modules or components together in any particular way that suits his or her technical needs. As a result, the modular test device may provide a more flexible, customizable, and cost-friendly option when compared to conventional systems or methods.

FIG. 1 illustrates a block diagram 100 of a test instrument 101 for performing tests and measurements in a network, according to an example. The test instrument 101 may include a variety of internal or external components. For instance, the test instrument 101 may be connected to a network (e.g., an optical network) at any desired test point (TP) to measure signals transmitted in the network. In some examples, this may involve using any number of (pluggable) transceivers, fiber-optic links, or other input/output. The test instrument 101 may also include a ports interface 103 with a plurality of ports. In some examples, the ports interface 103 may be used to facilitate connection of the test instrument 101 to one or more test points (TPs). It should be appreciated that the ports interface 103 may include any number of adapters or ports, such as coaxial RF cable connectors, as well as other cable or non-cable ports, for example, to connect to a computer or to an external display, such as, but not exclusively, one or more USB ports, telephone, Ethernet, optical, and the like. These may or may not also include the elements/ports shown and described with respect to the interfaces shown in FIG. 2C.

The test instrument 101 may also include a telemetry interface 104 for connecting to a telemetry channel, such as a WiFi interface, Bluetooth interface, cellular interface or another network interface. The telemetry interface 104 may function as an additional communication channel. For example, the test instrument 101 may connect to any number of remote devices via the telemetry interface 104.

In some examples, the test instrument 101 may include any number of user interfaces, which may include a keypad 105 and/or display 113. For example, the display 113 may include a touch screen display or other display. In some examples, a user (e.g., a technician) may interact with the test instrument 101 via the user interface to enter information, select operations, view measurements, examine signal profiles, communicate with other devices, generate reports, etc.

A data storage 151 may also be found in the test instrument 101. The data storage 151, for example, may store any information used by the test instrument 101 and may include memory or another type of known data storage device. The data storage 151 may store data, power level measurements, and/or any other test and measurements or data used by the test instrument 101. The data storage 151 may include a non-transitory computer readable medium storing machine-readable instructions executable by processing circuit 250 to perform various actions or operations of the test instrument 101.

The test instrument 101 may also include a transmission circuit 141. The transmission circuit 141 may include a circuit for sending test signals into the network to perform various tests. For example, the transmission circuit 141 may include, among other things, encoders, modulators, and other known component for transmitting signals in the network. A receiver circuit 142 may include components for receiving signals from the network. The transmission circuit 141 and/or the receiver circuit 142, for example, may also include other components, such as a demodulator, a decoder, an analog-to-digital converter (ADC), a digital-to-analog converter (DAC), and/or other circuit components or elements.

The processing circuit 150 in the test instrument 101 may include any suitable hardware to perform the operations of the test instrument 101 described herein. The hardware of the test instrument 101, including the processing circuit 150, may include at least one of hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 101 described herein may be performed by the processing circuit 150 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 101 may also include components other than what is shown.

As described herein, the test instrument 101 may perform a variety of tests and measurements in a network. In some examples, the network may be a local area network (LAN), wide area network (WAN), the Internet, a cellular network, a cable network, a satellite network, or other network that facilitates communications between the client devices, service providers, or any other system, component, or device connected to the network. The network may further include one, or any number, of the exemplary types of networks mentioned above operating as a stand-alone network or in cooperation with each other. For example, the network may utilize one or more protocols of one or more clients or servers to which they are communicatively coupled. Although the network is described as a single network, it should be appreciated that in some examples, the network may include a plurality of interconnected networks as well.

As mentioned above, the test instrument 101, among other things, may be used for performing any number of tests or measurements for the telecommunications network and/or optical products. It should be appreciated that various settings may be involved in configuring the test instrument 101 to perform the tests and measurements described herein. These settings and configurations, when done appropriately, may help ensure proper operation of these system components. The systems and methods described herein may optimize these settings and configurations for the examples below so that users may be able to perform the tests and measurements in an efficient and expedient manner.

Reference is now made with respect to FIGS. 2A-2D. FIGS. 2A-2D illustrate several views 200A-200D of a modular test instrument 101 for performing tests and measurements in a network, according to an example. It should be appreciated that the various views of test instrument 101 depicted in FIGS. 2A-2D may be examples. Thus, test instrument 101, in these views 200A-200D, may or may not include additional features and some of the features described herein may be removed and/or modified without departing from the scopes of the systems and methods outlined herein.

Figure 2A:
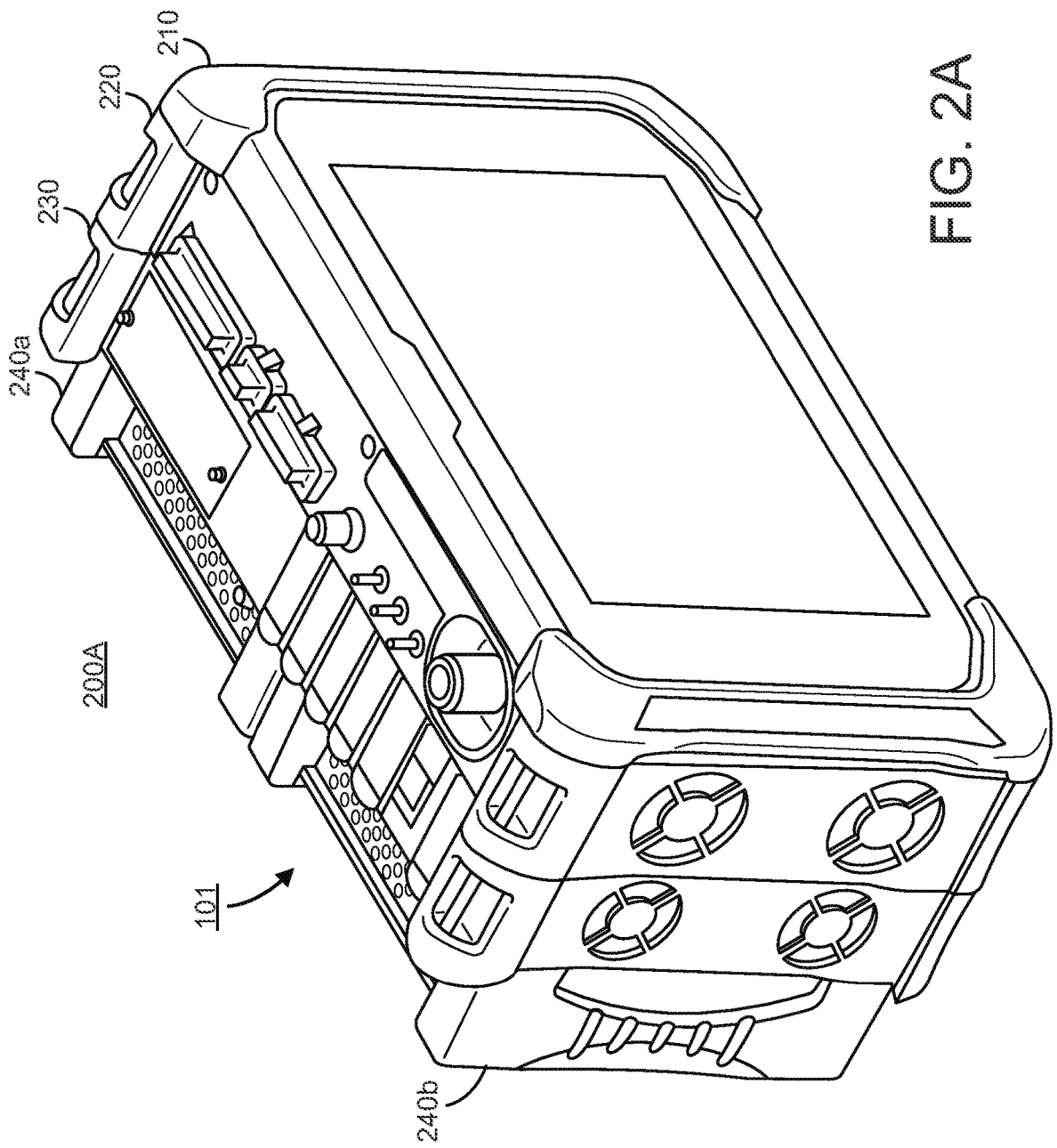
FIGS. 2A-2D illustrate several views of a modular test instrument for performing tests and measurements in a network, according to an example.
Figure 2B:
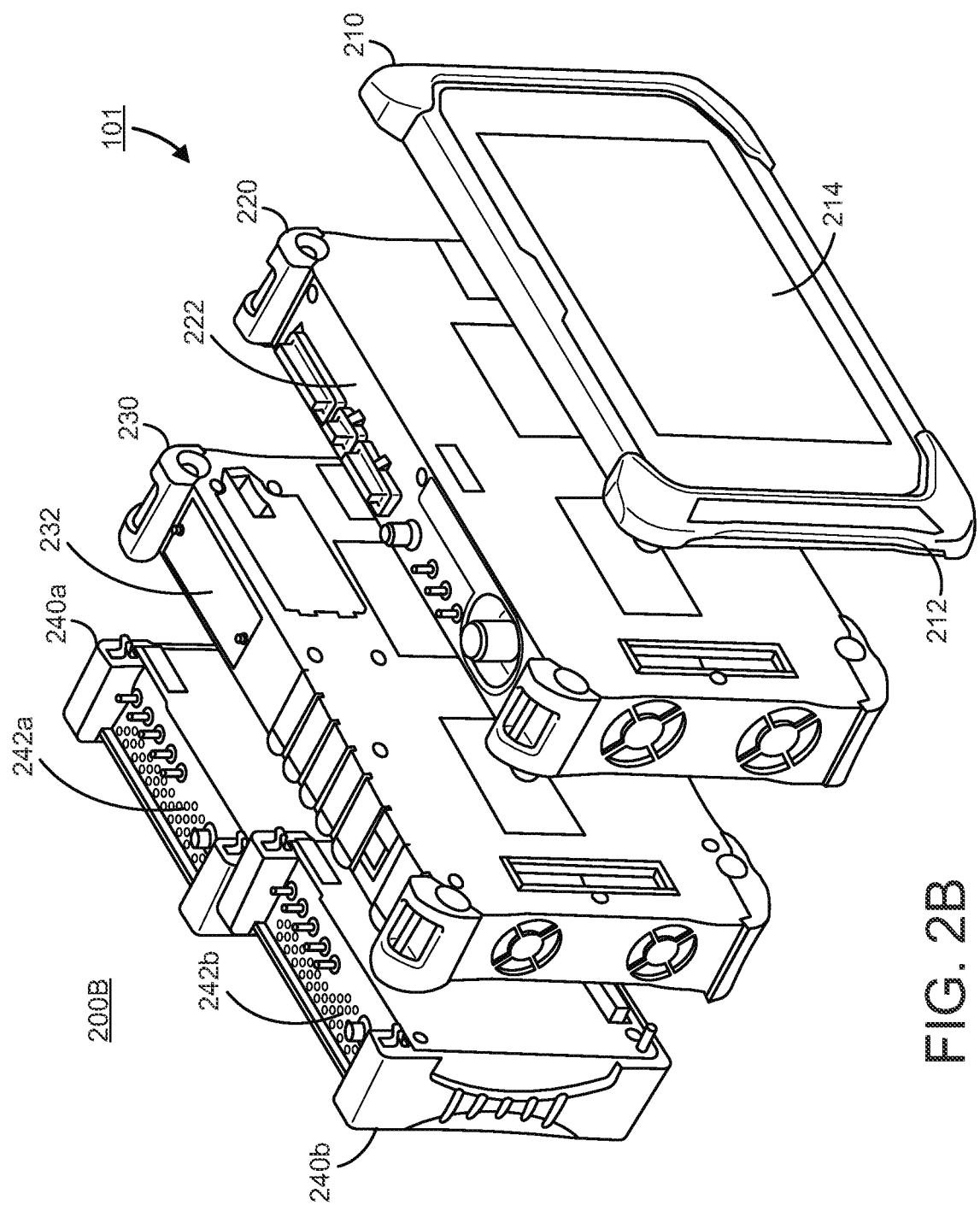

FIG. 2A illustrates a perspective view 200A of the modular test instrument 101 of FIG. 1 for performing tests and measurements in a network, according to an example. FIG. 2B illustrates a perspective view 200B of the various modular components. As shown, the test instrument 101 may be formed of a plurality of modular components that are designed to be fitted together. The perspective views 200A and 200B may illustrate a particular configuration of these modular components, all of which can be fitted together or separated from one another. In some examples, these modular components may include a display module 210, a test module 220, a processing module 230, and half modules (or sub-modules) 240*a* and 240*b*.

Each of these modular components may have couplers that may facilitate coupling between these components. The couplers may involve any number of mechanical, electrical, magnetic, or other coupling technology. As shown, the modular components may use any number of mechanically-fitted pegs and/or snap-and-release couplers at the edges and/or corners of the modular components. These pegs or couplers, for example, may allow the modular components to be properly aligned. Once aligned, there may be any number of mechanical/electrical/magnetic leads on the coupling or connecting faces of the modular components that can be fitted with each other, e.g., 9-pin male and female connection. Once connected, the modular components may form an communication of data between each of the modules and form an integrated test instrument 101. The various coupling mechanism will be described in more detail below. It should be appreciated that other various modular components or coupling variations may also be provided or substituted.

The display module 210, for example, may include a chassis 212 that encloses a display element 214, which may include, but not limited to, a liquid crystal display (LCD), light emitting diode (LED) display, organic light emitting diode (OLED) display, or any other suitable or similar display element. The display element 214 may also be a touchscreen display that may be capable of receiving one or more inputs via touch. In some examples, the touchscreen may be based on any number of touchscreen technologies, such as resistive, capacitive, acoustic (e.g., surface acoustic wave (SAW)), optics (e.g., infrared (IR) touch), and/or other touchscreen technology.

As mentioned above, a user (or technician) may drop the test instrument 101 on the ground and being that the display element 214 may be generally made of delicate material that is more susceptible to damage, the display element 214 may crack or be damaged due to impact or blunt force, causing it to malfunction or fail. Even in scenarios where care is taken to protect the test instrument 101 and the display module 210, the display element 214 may still suffer damage during normal routine testing environments and travel conditions. In these and other similar scenarios where damage is incurred at the display module 210, rather than discarding the entire test instrument 101 or sending the entire test instrument 101 for repair (putting it out of commission for the duration of the repair), the modular test instrument 101 may allow the user to easily replace the broken or inoperative display module 210 with a functional replacement display module 210. As will be described in more detail below, the replacement display module 210 may be designed and configured to have the same or similar mechanical, electrical, or mechanical couplers as the broken or damaged display module 210. In this way, the user (or technician) can simply remove the damaged display module 210 and readily replace it with the replacement display module 210. Display modularity may provide flexibility, ease of use, cost long-term cost savings, and reduce loss of testing time due to out-of-commission testing units.

In addition or alternatively, it should be appreciated that in some scenarios the display module 210 may be replaced by a faceplate or cap that has no display element 214. In this example, the faceplate or cap may still be coupled to the other components or modules of the modular test instrument 101 but without any display functionality. A faceplate or cap may be an option chosen by the user or technician, e.g., when a replacement display module 210 is unavailable, reduce size or bulkiness of the test instrument 101, or to simply save costs. In this way, the modular test instrument 101 may still operate and perform any number of tests or measurements, but may rely on another output or external display module via wired or wireless connectivity. The faceplate or cap may then serve to protect the open face(s) of the components or modules of the modular test instrument 101.

The test module 220 may be a modular component of the test instrument 101 that enables or facilitates performance of any number of tests or measurements. For example, the test module 220 may be a fiber test module that enables or facilitates performance of any number of tests or measurements in an optical network, especially those associated with inspection of an optical fiber cable or related element. As such the test module 220 may include a test module interface 222 having any number of variety of ports to communicatively couple the test instrument 101 to a fiber-optic link, a server, a transceiver, any number of cables, adapters, or connectors, and/or other network element to perform the tests or measurements. In some examples, the test module interface 222 may include ports to receive optical fiber connectors, transceivers, and/or other adapters, pluggables, cables, or connectors. These may include ports for SFP+/SFP28 and QSFP+/QSFP28 transceivers, GNSS antenna inputs, and/or cables for spectrum analyzers, etc. Some additional examples may be discussed in more detail with respect to FIG. 2C below.

The processing module 230, for example, may include various hardware and software elements, such as a CPU and/or other processing units to enable control of the test instrument. The processing module 230 may include any number of processors, graphical cards, audio cards, or other processing-related hardware or software to enable the various tests and measurements performed by the test instrument 101. In some examples, the processing module 230 may also include a processing module interface 232, which may include, but not limited to, any number of ports or slots for power, Ethernet, USB, audio, memory, etc. The interface of the processing module 230 may also include a removable faceplate to upgrade various internal system elements, such as memory, processor, or other related circuitry. Some additional examples may be discussed in more detail with respect to FIG. 2C below.

The half- or sub-modules 240a or 240b may include components for performing other various tests and measurements. These may include, for example, tests and measurements associated with optical time domain reflectometry (OTDR), cable and antenna analyzer (CAA), etc. Thus, in some examples, one of the half- or sub-modules 240a may be an OTDR module capable of enabling or facilitating OTDR tests and measurements, and the other half- or sub-module 240b may be a CAA module capable of enabling or facilitating CAA tests and measurements. The OTDR module, for example, may perform, among other things, any number of LTE or 5G related tests and measurements, such as beam tracking and analysis, rout map for coverage verification mapping, carrier scanning and/or carrier power, real-time spectrum and interference analysis, etc. The CAA module, for example, may perform, among other things, any number of tests and measurements associated with cable analysis, such as tests and measurements for distributed radios with coaxial feedlines, troubleshooting or maintaining fiber optic links, distributed antenna systems (DAS) deployment validation, near field communication (NFC) antenna tests (e.g., for radio-frequency identification (RFID) and security equipment), etc. Each of the half- or sub-modules 240a and 240b may have a half- or sub-module interface 242a or 242, respectively, to he enable various connections, pairings, etc. in order to perform the tests and measurements configured for each module. It should be appreciated that other various or combinations of half- or sub-modules 240a and 240b may also be provided for the test instrument 101.

Figure 2C:
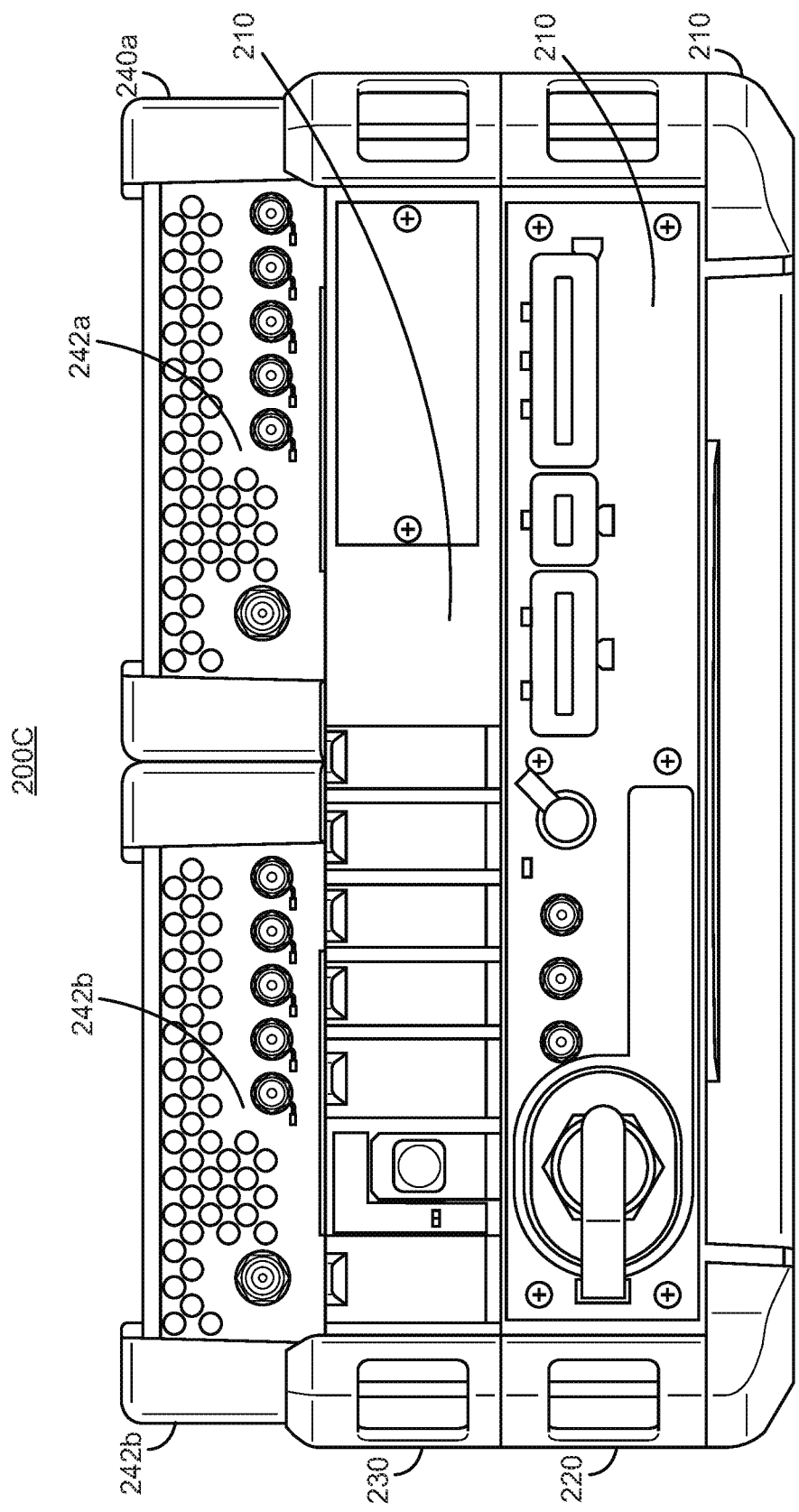

FIG. 2C illustrates a planar view 200C of the various interfaces 222, 232, 242a, and 242b of the modular components 220, 230, and 240 of the test instrument 101, according to an example. As shown, the test module interface 222 may include a variety of ports to receive optical fiber connectors, transceivers, and/or other adapters, pluggables, cables, or connectors. These may include, but not limited to, ports for SFP+/SFP28 and QSFP+/QSFP28 transceivers, GNSS antenna inputs, BITS, trigger I/O, and/or I/O port(s) for spectrum analyzers, etc. The processing module interface 232 may include ports, but not limited to, for a power adapter or for battery recharging, Ethernet (e.g., Cat5/RJ45), a plurality of universal serial bus (USB) ports (e.g., USB 2.0, USB 3.0, etc.), audio port (for earbuds, headphones, speakers, or other external audio output), memory slot (e.g., SD memory card), etc. As shown, the processing module interface 232 may also include a removable faceplate, which may offer memory, processor, or other circuit-related upgrades, as well as protection for other more sensitive ports or adapters that may be more easily damaged. Other various ports (I/O) may also be included in any of these the various interfaces 222, 232, 242a, and 242b, such as USB-C, micro SD, antenna, single mode (SM) or multi-mode (MM) optical fibers, coaxial, or other similar port for enabling transmission or reception of data between the test instrument 101 and externals systems or elements.

Figure 2D:
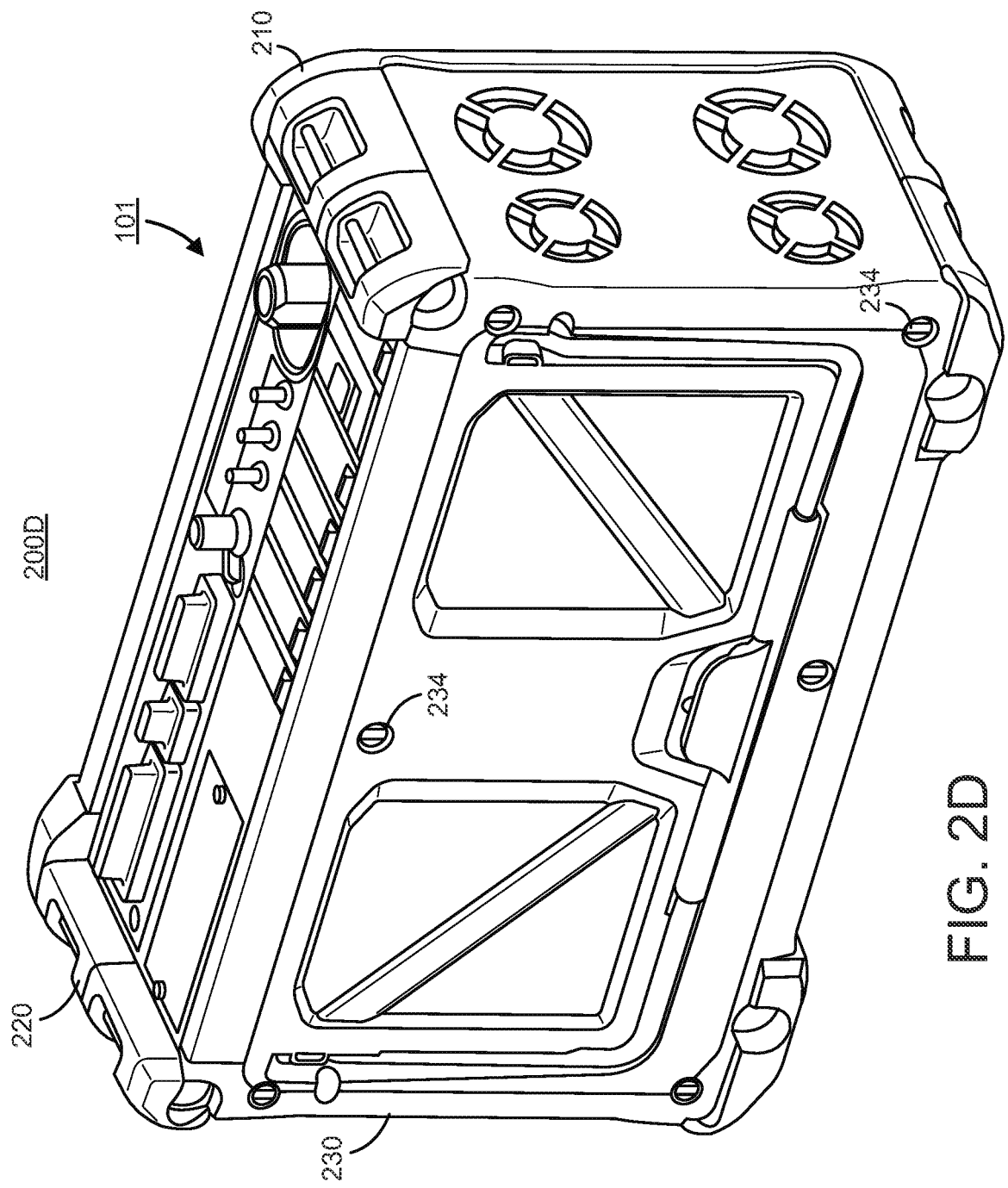

FIG. 2D illustrates a rear perspective view 200D of modular components 210, 220, and 230 of the modular test instrument 101 in an integrated configuration, according to an example. As shown, the display module 210, the test module 220, and the processing module 230 may be interconnected. In the rear perspective view 200D, coupling areas 234 may be provided on each of the various modules. For example, these coupling areas 234 may be provided in each of the modules to allow any variety of mechanical, electrical, magnetic, or other coupling to form an integrated test instrument 101, as shown.

In some examples, this coupling area 234 (or other area of the modular components) may provide a mechanical latch mechanism to hold two modules together. It should be appreciated that there may be pegs, latches, hooks, or alignment arrows (not shown) that may help provide mechanical alignment. Although screws, fittings, and adhesives may be used as part of the mechanical mechanisms to attach the various modules together, it should be appreciated that these elements typically do not facilitate ease of detachment between the modular components. In some examples, the coupling areas 234 (or other area of the modular components) may also include electrical leads or electrical contacts so that data, power, and/or other signals may be shared and communicated between the various modular components. It should be appreciated that these electrical leads or contacts may be found on any of the connector faces of the modular components. For example, the display connector face of the display module 210 may include a 9-pin electrical connector (male) that may be fitted with a 9-pin electrical connector (female) of the first connector face of the processing unit or test unit. When fitted together, data may be exchanged from one module to the next. Although a 9-pin electrical connector is described, other types of electrical connectors with any number of pins may also be provided. It should also be appreciated that in some examples, data may be exchanged wirelessly and without any hard-wired electrical connection. For instance, communication of data may be provided via Bluetooth, Wi-Fi, radio, or other wireless connection.

In addition or alternatively, the coupling areas 234 (or other area of the modular components), for example, may also include one or more magnets. These magnets may help provide alignment and/or integration of the modular components into a single test instrument 101. The magnetic coupling mechanisms may help provide a magnetic hold between the modular components, as well as an efficient way to provide simple attachment or detachment of the modular components.

While examples described herein are directed to configurations as shown, it should be appreciated that any of the components described herein may be altered, changed, replaced, or modified, in size, shape, and numbers, or material, depending on application or use case, and adjusted for desired or test and measurement results. For example, the modular components 210, 220, 230, and 240 may be connected in any combination to increase flexibility and customization. In some scenarios, the display module 210 may be directly connected to the test module 220, for example, without a processing module 230, assuming the display module 210 and/or the test module 220 includes sufficient processing capabilities to function and operate. In some scenarios, there may be several additional modular components that are stacked together. For example, additional processing modules and testing modules (or submodules) may be stacked beyond what is shown in the figures to provide a more robust modular test instrument. Other various configurations, alternatives, combinations, or examples may also be provided.

FIG. 3 illustrates a flow chart of a method 300 for providing, using or making, a modular test instrument for performing tests and measurements, according to an example. The method 300 is provided by way of example, as there may be a variety of ways to carry out the method described herein. Although the method 300 is primarily described as being performed by the systems shown in FIGS. 1 and/or 2A-2D, respectively, the method 300 may be executed or otherwise performed by one or more processing components of another system or a combination of systems. Each block shown in FIG. 3 may further represent one or more processes, methods, or subroutines, and one or more of the blocks may include machine readable instructions stored on a non-transitory computer readable medium and executed by a processor or other type of processing circuit to perform one or more operations described herein.

At block 301, a modular display unit may be provided. In some examples, the modular display unit may include a display element, a display face to present the display element, and/or a display connector face to connect to other modular units comprising a display element.

In some examples, and as described herein, the display element may be a touchscreen. The display element, among other things, may be a liquid crystal display (LCD), a light emitting diode (LED) display, an organic light emitting diode (OLED) display, or other display. Furthermore, the touchscreen may be based on resistive, capacitive, acoustic, optic technology, or other display technology.

At block 302, a modular processing unit may be provided. In some examples, the modular processing unit may include a processor and/or a memory. Furthermore, the modular processing unit may include a processing unit interface, a first processing unit connector face, and/or a second processing unit connector face. As described herein, the processing unit interface may include one or more ports for connecting to a power adapter, an Ethernet link, a universal serial bus (USB) connector, an audio input or output, a memory card, and/or other inputs/outputs.

At block 303, a modular test unit may be provided. In some examples, the modular test unit may include a test unit interface, a first test unit connector face, and/or a second test unit connector face. In some examples, the test unit interface may include one or more ports for connecting to an optical fiber, a trigger input or output, an antenna link, a pluggable transceiver, or other link to perform any number of tests and measurements.

As mentioned above, these modular units or components may be fitted and attached to one another in any number of configurations. In some examples, the first test unit connector face of the first test unit may be configured to be communicatively coupled to at least one of the display connector face of the modular display unit or the second processing unit connector face of the modular processing unit. In some examples, the first processing unit connector face of the modular processing unit may be configured to be communicatively coupled to at least one of the display connector face of the modular display unit or the second test unit connector face of the modular test unit.

Also, as described above, the method may further include providing at least one additional modular test subunit. In some examples, each of the additional modular test subunits may include an additional test unit interface, a first additional test unit connector face, and/or a second additional test unit connector face. In terms of modular connectivity, the first additional modular test subunit connector face of each of the at least one additional modular test subunits, in some examples, may be configured to be communicatively coupled to at least one of the second processing unit connector face of the modular processing unit or the second test unit connector face of the modular test unit. In some examples, the additional test unit interface may also include one or more ports for connecting to a coaxial cable, a single mode (SM) optical fiber, a multi-mode (MM) optical fiber, an antenna link, and/or other link for performing tests or measurements.

It should be appreciated that when the modular display unit, the modular test unit, the modular processing unit, and/or the at least one additional modular test subunit is fitted and attached to one another so that the test instrument becomes an integrated, single test instrument for performing a network-related test or measurement, the single modular test instrument may perform at least one of the following tests or measurements: spectrum analysis, cable or fiber-optic link tests, radio or antenna tests, measurements using transceivers, or other tests and measurements. In some examples, these tests and measurements may also include optical time domain reflectometry (OTDR), cable and antenna analyzer (CAA), or other tests sets required for network troubleshooting, provisioning, or maintenance.

It should be appreciated that the systems and methods described herein may facilitate tests and measurements in a single, modular test instrument. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the tests and measurements described herein, for example, may also be performed partially or in full by other various components of the overall system.

It should be appreciated that local or remote data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various modules, components, circuits, elements, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include any number of interfaces, as shown or beyond what is shown, to communicate with each other and other systems, components, or elements via a network or other communication protocol.

Although examples are directed to test and measurement systems, it should be appreciated that the systems and methods described herein may also be used in other various systems and other implementations. For example, there may be numerous applications in optical communication networks and fiber sensor systems that could employ the systems and methods as well.

It should be appreciated that the systems and methods described herein may also be used to help provide, directly or indirectly, measurements associated with a cell site, optical cable, antenna, or other telecommunications environment. Utilizing a test device formed of any number of modular components may not only provide a multitude of potential test functions in a single device, but may also provide added customization and flexibility, all of which may reduce test and measurement time, increase efficiencies, and minimize repair or replacement costs to damaged test devices. The systems and methods described herein may therefore provide mechanical simplicity and adaptability to growing needs in testing and maintaining telecommunication networks.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test instrument, comprising:
   a modular display unit comprising a display element to display results and a display connector;
   a modular processing unit comprising a processor, a first processing-unit connector, and a second processing-unit connector;
   a modular test unit to facilitate performance of tests or measurements, comprising a test-unit interface, a first test-unit connector, and a second test-unit connector, wherein the first test-unit connector is to be coupled to the first processing-unit connector or the display connector; and
   a modular test subunit to perform additional tests or additional measurements, comprising a first test-subunit connector to be coupled to the second processing-unit connector.

2. The test instrument of claim 1, wherein the modular display unit is replaceable with another modular display unit or a non-display faceplate.

3. The test instrument of claim 1, wherein the display element of the modular display unit is a touchscreen comprising one of a liquid crystal display (LCD), a light emitting diode (LED) display, or an organic light emitting diode (OLED) display.

4. The test instrument of claim 3, wherein the touchscreen is based on at least one of resistive, capacitive, acoustic, or optic technology.

5. The test instrument of claim 1, the test-unit interface of the modular test unit comprises at least one port for connecting to one of: an optical fiber, a trigger input or output, an antenna link, or a pluggable transceiver.

6. The test instrument of claim 1, wherein the test-unit interface of the modular test unit comprises a port for connecting to one of: a coaxial cable, a single mode (SM) optical fiber, a multi-mode (MM) optical fiber, or an antenna link.

7. The test instrument of claim 1, wherein the modular processing unit further comprises a port for connecting to one of: a power adapter, an Ethernet link, a universal serial bus (USB) based connector, an audio input or output, or a memory card.

8. The test instrument of claim 1, wherein the modular display unit, the modular processing unit, the modular test unit, and the modular test subunit are fitted and attached to one another via coupling mechanisms to cause the test instrument to be an integrated, single test instrument for performing a network-related test or measurement.

9. The test instrument of claim 8, wherein the network-related test or measurement comprises at least one of: spectrum analysis, cable or fiber-optic link tests, radio or antenna tests, or measurements using transceivers.

10. The test instrument of claim 1, wherein the additional tests or additional measurements that the modular test subunit performs include: optical time domain reflectometry (OTDR), cable and antenna analyzer (CAA), or cable or fiber inspection.

11. A method for providing a modular test instrument, comprising:
    providing a modular display unit comprising a display element to display results and a display connector;
    providing a modular processing unit comprising a processor, a first processing-unit connector, and a second processing-unit connector;
    providing a modular test unit to facilitate performance of tests or measurements, comprising a test-unit interface, a first test-unit connector, and a second test-unit connector, wherein the first test-unit connector is to be coupled to the first processing-unit connector or the display connector; and
    providing a modular test subunit to perform additional tests or additional measurements, comprising a first test-subunit connector to be coupled to the second processing-unit connector.

12. The method of claim 11, wherein the modular display unit is replaceable with another modular display unit or a non-display faceplate.

13. The method of claim 11, further comprising:
    fitting and attaching the modular display unit, the modular processing unit, the modular test unit, and the modular test subunit to one another via coupling mechanisms to cause the modular test instrument to be an integrated, single test instrument for performing a network-related test or measurement.

14. The method of claim 13, wherein the network-related test or measurement comprises at least one of: spectrum analysis, cable or fiber-optic link tests, radio or antenna tests, or measurements using transceivers.

15. The method of claim 11, wherein the test-unit interface of the modular test unit comprises a port for connecting to one of: a coaxial cable, a single mode (SM) optical fiber, a multi-mode (MM) optical fiber, or an antenna link.

16. The method of claim 11, wherein the additional tests or additional measurements that the modular test subunit performs include: optical time domain reflectometry (OTDR), cable and antenna analyzer (CAA), or cable or fiber inspection.

17. A test instrument, comprising:
    a modular display unit comprising a display element to display results and a display connector;
    a modular processing unit comprising a processor, a memory, a processing unit interface, a first processing-unit connector, and a second processing-unit connector;
    a modular test unit to facilitate performance of tests or measurements, comprising a test-unit interface, a first test-unit connector, and a second test-unit connector, wherein the first test-unit connector is to be coupled to the first processing-unit connector or the display connector; and
    a modular test subunit to perform additional tests or additional measurements, comprising a test subunit interface, and a first test subunit connector,
    wherein the second processing-unit connector of the modular processing unit is communicatively coupled to the first test subunit connector of the modular test subunit, and
    wherein the display connector of the modular display unit comprises at least one coupling mechanism to enable connectivity and integration with at least one of the modular processing unit or the modular test unit, the at least one coupling mechanism comprising at least one of a mechanical coupler, an electrical coupler, or a magnetic coupler.

18. The test instrument of claim 17, wherein the modular display unit is replaceable with another modular display unit or a non-display faceplate.

19. The test instrument of claim 17, wherein the display element of the modular display unit is a touchscreen comprising one of a liquid crystal display (LCD), a light emitting diode (LED) display, or an organic light emitting diode (OLED) display.

20. The test instrument of claim 17, the test-unit interface of the modular test unit comprises at least one port for connecting to one of: an optical fiber, a trigger input or output, an antenna link, or a pluggable transceiver.

\* \* \* \* \*